(12) United States Patent
Takayama et al.

(10) Patent No.: US 10,396,619 B2
(45) Date of Patent: Aug. 27, 2019

(54) ELECTRIC MOTOR

(71) Applicant: DAIKIN INDUSTRIES, LTD., Osaka-shi, Osaka (JP)

(72) Inventors: Yoshinori Takayama, Kusatsu (JP); Tatsuya Ogawa, Kusatsu (JP); Junji Tsukida, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 288 days.

(21) Appl. No.: 15/322,622

(22) PCT Filed: Jun. 11, 2015

(86) PCT No.: PCT/JP2015/066863
§ 371 (c)(1),
(2) Date: Dec. 28, 2016

(87) PCT Pub. No.: WO2016/002464
PCT Pub. Date: Jan. 7, 2016

(65) Prior Publication Data
US 2017/0133904 A1 May 11, 2017

(30) Foreign Application Priority Data
Jun. 30, 2014 (JP) .................. 2014-133981

(51) Int. Cl.
*H02K 5/16* (2006.01)
*F16C 19/06* (2006.01)
(Continued)

(52) U.S. Cl.
CPC ............... *H02K 5/16* (2013.01); *F16C 19/06* (2013.01); *F16C 19/52* (2013.01); *F16C 19/54* (2013.01);
(Continued)

(58) Field of Classification Search
CPC ...... H02K 7/086; H02K 11/40; H02K 5/1737; H02K 5/16; F16C 19/06; F16C 19/52; F16C 19/54; F16C 35/042; F16C 2380/26
See application file for complete search history.

(56) References Cited

U.S. PATENT DOCUMENTS 5,334,895 A * 8/1994 Morioka .................. F16J 15/43
310/67 R
5,454,724 A 10/1995 Kloeppel et al.
(Continued)

FOREIGN PATENT DOCUMENTS

CN 102290905 A 12/2011
JP 2003-235198 A 8/2003
(Continued)

OTHER PUBLICATIONS

International Preliminary Report of corresponding PCT Application No. PCT/JP2015/066863 dated Jan. 3, 2017.
(Continued)

*Primary Examiner* — Jue Zhang
(74) *Attorney, Agent, or Firm* — Global IP Counselors, LLP (57) ABSTRACT

An electric motor includes a conductive shaft extending along an axis of rotation and passing through a back yoke to be fixed to one of a stator and a rotor. At least one bearing includes a conductive inner ring fixed to the shaft and a conductive outer ring rotatably coupled to the inner ring. A conductive bearing housing extends so as not to be located in a first area at one side with respect to the stator along an axial direction extending along the axis of rotation but to be located in a second area at the opposite side along the axis direction. The bearing housing is fixed to the outer ring of the bearing and to the other of the stator and the rotor. An
(Continued)

electric motor is configured to be oppositely spaced from a plate electrically grounded in the axial direction.

12 Claims, 4 Drawing Sheets

(51) Int. Cl.
| | |
|---|---|
| *F16C 19/54* | (2006.01) |
| *F16C 25/08* | (2006.01) |
| *H02K 7/08* | (2006.01) |
| *F16C 19/52* | (2006.01) |
| *H02K 21/22* | (2006.01) |
| *H02K 5/173* | (2006.01) |
| *H02K 11/40* | (2016.01) |

(52) U.S. Cl.
CPC ......... *F16C 25/083* (2013.01); *H02K 5/1737* (2013.01); *H02K 7/08* (2013.01); *H02K 11/40* (2016.01); *H02K 21/22* (2013.01); *F16C 2380/26* (2013.01)

(56) References Cited

U.S. PATENT DOCUMENTS

| | | | |
|---|---|---|---|
| 5,729,404 A * | 3/1998 | Dunfield | ................ G11B 17/02 360/99.08 |
| 8,928,209 B2 | 1/2015 | Min et al. | |
| 9,071,090 B2 | 6/2015 | Watanabe et al. | |
| 2011/0309724 A1 | 12/2011 | Min et al. | |

FOREIGN PATENT DOCUMENTS

| | | |
|---|---|---|
| JP | 2012-130217 A | 7/2012 |
| JP | 2013-66253 A | 4/2013 |
| JP | 2013-70616 A | 4/2013 |

OTHER PUBLICATIONS

European Search Report of corresponding EP Application No. 15 81 5336.1 dated Sep. 22, 2017.
International Search Report of corresponding PCT Application No. PCT/JP2015/066863 dated Sep. 1, 2015.

* cited by examiner

ELECTRIC MOTOR

CROSS-REFERENCE TO RELATED APPLICATIONS

This U.S. National stage application claims priority under 35 U.S.C. § 119(a) to Japanese Patent Application No. 2014-133981, filed in Japan on Jun. 30, 2014, the entire contents of which are hereby incorporated herein by reference.

TECHNICAL FIELD

The present invention relates to an electric motor.

BACKGROUND ART

Japanese Patent Application Laid-Open No. 2013-66253 describes an electric motor. According to Japanese Patent Application Laid-Open No. 2013-66253, the electric motor includes a stator and a rotor, and the rotor faces the stator radially with an air gap therebetween. The rotor is fixed to the shaft so as not to rotate thereabout, and the stator is fixed to the shaft with bearings therebetween so as to rotate about the shaft. As a result, the rotor is rotatably fixed to the stator.

Fixing of the stator and the shaft will be described below more specifically. The stator is covered with a resin mold, and conductive brackets are fixed to the resin mold. The brackets are also fixed to the bearings. Each of the bearings includes conductive inner and outer rings and a conductive rolling element. The rotation of the rolling element between the inner and outer rings causes the inner and outer rings to rotate with each other. According to Japanese Patent Application Laid-Open No. 2013-66253, since two bearings are provided, two brackets are provided as well.

The two brackets are electrically connected to each other via a conductive pin, thus preventing or reducing the occurrence of galvanic corrosion in the bearings.

SUMMARY

There is still room for improvement in view of preventing or reducing galvanic corrosion.

The present invention therefore has an object to provide an electric motor capable of preventing or reducing galvanic corrosion of a bearing.

Means to Solve the Problem

A first aspect of an electric motor according to the present invention is an electric motor to be oppositely spaced from a plate (60) electrically grounded in an axial direction extending along an axis of rotation (P). The electric motor includes a rotor (10), a stator (20), a shaft (30), a at least one bearing (41, 42), and a bearing housing (50). The rotor (10) rotates about the axis of rotation (P). The stator (20) is located at a side adjacent to the axis of rotation (P) with respect to the rotor and includes teeth (211), a back yoke (212), and windings (22). The teeth face the rotor with an air gap therebetween and have conductivity. The back yoke couples ends of the teeth at the side adjacent to the axis of rotation (P) to each other and has a tubular shape and conductivity. The windings are wound around the teeth. The shaft (30) extends along the axis of rotation (P) and passes through the back yoke to be fixed to one of the stator and the rotor. The at least one bearing (41, 42) includes an inner ring (411, 421) and an outer ring (412, 422). The inner ring is fixed to the shaft and has conductivity, and the outer ring is fixed to the inner ring so as to rotate relative thereto and has conductivity. The bearing housing (50) extends so as not to be located in a first area at a side adjacent to the plate with respect to the stator (20) in the axial direction and to be located in a second area opposite the plate in the axial direction. The bearing housing (50) is fixed to the outer ring of the at least one bearing and to the other of the stator and the rotor.

In a second aspect of the electric motor according to the present invention, in the electric motor according to the first aspect, the stator (20) includes a stator core (21) having a hole (26) into which the shaft (30) and the bearing housing (50) are inserted. An end surface (54) of the bearing housing at the side adjacent to the plate (60) is located between an end surface of the stator core opposite the plate and a center of the stator core in the axial direction.

In a third aspect of the electric motor according to the present invention, in the electric motor according to the first or second aspect, the at least one bearing includes a plurality of the bearings (41, 42). The bearing housing (50) has a tubular shape surrounding the shaft (30) with an air gap therebetween and contacts at least two of the outer rings (412, 422) of the plurality of bearings.

In a fourth aspect of the electric motor according to the present invention, in the electric motor according to the third aspect, the bearing housing (50) includes a part located at a side adjacent to the shaft (30) with respect to outer surfaces of the outer rings (412, 422) of the plurality of bearings (41, 42).

In a fifth aspect of the electric motor according to the present invention, in the electric motor according to the third or fourth aspect, a part of the bearing housing (50) is inserted into a hole (26) formed by an inner peripheral surface of the back yoke (212), and the other part of the bearing housing (50) extends along the axial direction outside the hole.

In a sixth aspect of the electric motor according to the present invention, in the electric motor according to any one of the first to fifth aspects, the bearing housing (50) is a one-piece member.

In a seventh aspect of the electric motor according to the present invention, in the electric motor according to any one of the first to sixth aspects, the stator (20) is insulated from the housing (50) and the shaft (30).

Effects of the Invention

According to the first aspect of the electric motor of the present invention, the electrostatic capacitance of a first stray capacitance between the plate and the bearing housing can be reduced. The plate opposed to the stator faces the shaft with a small area, and accordingly, a second stray capacitance between the plate and the shaft is also small. Consequently, the stray capacitance between the shaft and the plate has a value comparable to the value of the stray capacitance between the bearing housing and the plate, resulting in balanced stray capacitances. This reduces a potential difference between the bearing housing and the shaft, thus preventing or reducing galvanic corrosion in the bearing.

According to the second aspect of the electric motor of the present invention, a difference between the stray capacitance between the bearing housing and the stator core and the stray capacitance between the stator core and the shaft can be reduced. This reduces the potential difference between the bearing housing and the shaft, thus preventing or reducing galvanic erosion in the bearing.

According to the third aspect of the electric motor of the present invention, increasing the stray capacitance between the bearing housing that conducts with the outer ring of the bearing and the shaft that conducts with the inner ring of the bearing increases a combined stray capacitance of the outer ring and the inner ring, thus reducing a potential difference between the bearing housing and the shaft. The occurrence of galvanic corrosion in the bearing can thus be prevented or reduced.

According to the fourth aspect of the electric motor of the present invention, the stray capacitance between the bearing housing and the shaft can be increased.

According to the fifth aspect of the electric motor of the present invention, the length of the bearing housing in the axial direction can be increased while preventing an increase in the dimension of the electric motor in the axial direction. Thus, a stray capacitance between the outer ring and the inner ring of the bearing can be increased while preventing an increase in the dimension of the electric motor.

According to the sixth aspect of the electric motor of the present invention, the number of parts of the bearing housing can be minimized.

According to the seventh aspect of the electric motor of the present invention, a potential difference between the bearing housing and the shaft can be reduced more than in any of the cases where the stator contacts the bearing housing while being apart from the shaft and where the stator contacts the shaft while being apart from the bearing housing.

These and other objects, features, aspects and advantages of the present invention will become more apparent from the following detailed description of the present invention when taken in conjunction with the accompanying drawings.

DESCRIPTION OF EMBODIMENTS

Figure 1:
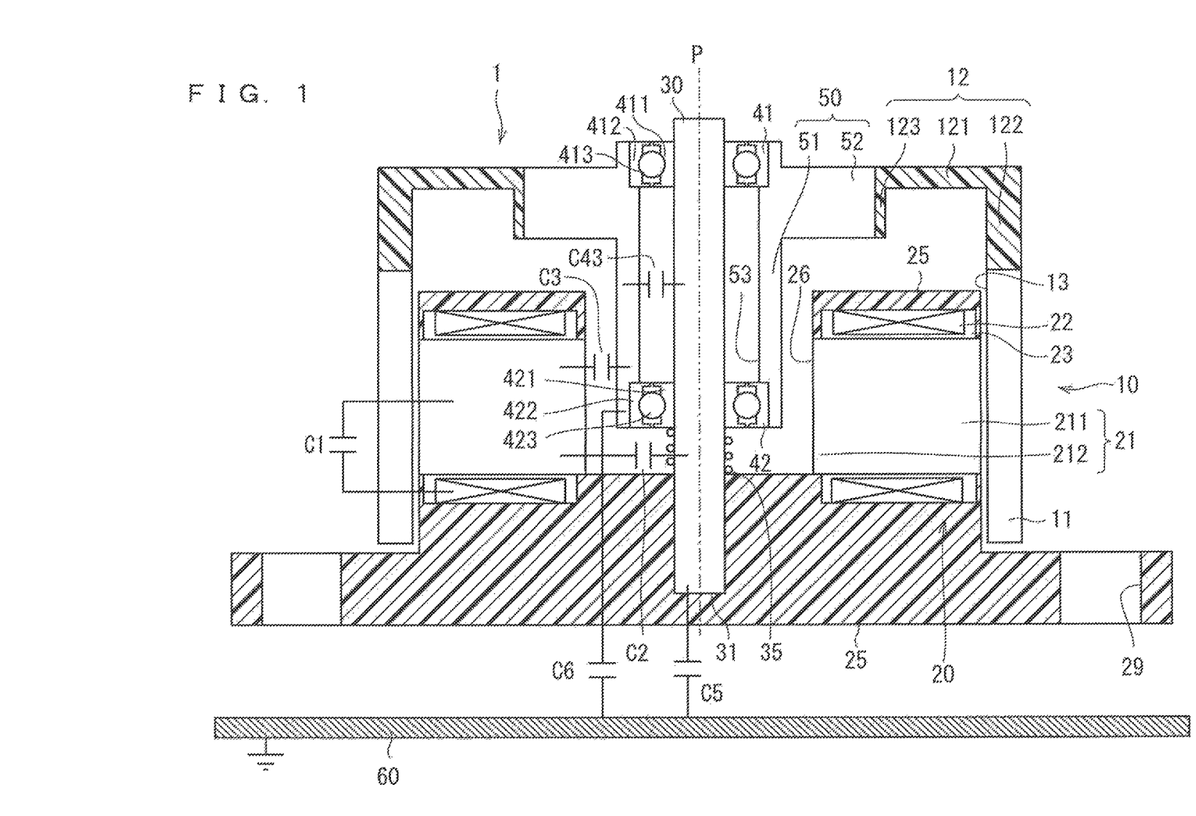
FIG. 1 is a sectional view of an example of a schematic configuration of an electric motor.

FIG. 1 is a sectional view of an example of a schematic configuration of an electric motor 1, illustrating the configuration of the electric motor 1 in a section including an imaginary axis of rotation P. The electric motor 1 includes a rotor 10, a stator 20, a shaft 30, a plurality of bearings 41 and 42, and a bearing housing 50.

The shaft 30 is a rod-shaped (for example, columnar) member extending along the axis of rotation P and has conductivity. The shaft 30 is made of, for example, metal such as stainless steel.

In the following description, the direction extending along the axis of rotation P is referred to as an axial direction, and a circumferential direction and a radial direction with respect to the axis of rotation P are merely referred to as a circumferential direction and a radial direction, respectively.

Figure 2:
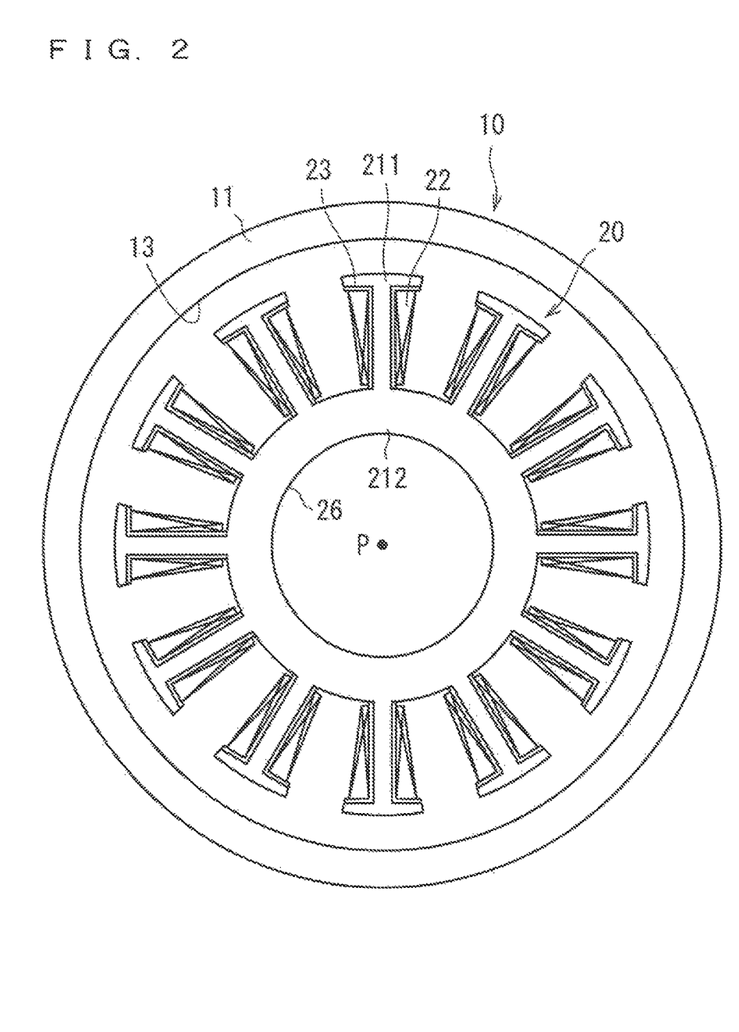
FIG. 2 is a sectional view of an example of schematic configurations of a stator and a rotor.

The stator 20 includes a stator core 21 and a winding 22. The stator core 21 is made of a soft magnetic material and has conductivity. The stator core 21 includes teeth 211 and a back yoke 212. FIG. 2 is a sectional view of an example of schematic configurations of the stator 20 and the rotor 10.

FIG. 2 illustrates a section that is perpendicular to the axis of rotation P and passes through the teeth 211.

The teeth 211 are arranged around the shaft 30 (axis of rotation P). More specifically, the teeth 211 are spaced from one another along the circumferential direction and are radially arranged about the axis of rotation P.

The back yoke 212 magnetically couples ends (with reference to FIG. 1, ends adjacent to the axis of rotation P) of the teeth 211 to one another. The back yoke 212 has, for example, a tubular (approximately cylindrical) shape about the axis of rotation P. The back yoke 212 thus has a hole 26 passing through the back yoke 212 along the axial direction.

The stator core 21 may be formed of, for example, laminated steel plates that are laminated along the axial direction. This reduces an eddy current generated in the stator core 21. The stator core 21 does not always need to be formed of laminated steel plates and, for example, may be a dust core including resin. This also reduces an eddy current.

The winding 22 is wound around the teeth 211 via, for example, an insulator 23. The winding 22 is wound around the teeth 211, with a winding axis being an axis that extends along the radial direction. The insulator 23 is formed of an insulating material and insulates the winding 22 from the teeth 211. Unless otherwise specified, "winding" in the present application does not refer to individual leads constituting a winding but refers to leads bound into a single group. The same also applies to the drawings. Leader lines at the start and end of winding and connections thereof are omitted as appropriate in the drawings.

The rotor 10 includes a magnetic pole member 11. The magnetic pole member 11 is a member that supplies a field magnetic flux to the stator 20 and faces the stator 20 with an air gap therebetween. In the illustration of FIG. 1, the magnetic pole member 11 is provided at the side adjacent to the outer periphery of the rotor 10 with respect to the stator 20 (opposite the shaft 30). The teeth 211 face the rotor 10 with an air gap therebetween at the side adjacent to the axis of rotation P with respect to the rotor 10. The electric motor 1 is a so-called outer-rotor motor.

The magnetic pole member 11 is formed of, for example, a permanent magnet and has a pole surface directed to the stator 20. The polarity of the pole surface alternates in the circumferential direction. The magnetic pole member 11 is, for example, a bonded magnet and has, for example, a tubular shape about the axis of rotation P. Thus, the magnetic pole member 11 has a hole 13 passing through the magnetic pole member 11, and the stator 20 is arranged inside the hole 13. A magnetic piece in the bonded magnet may be, for example, a ferrite magnet.

In the rotor 10 and the stator 20 as described above, the appropriate application of AC voltage to the winding 22 allows the stator 20 to supply a rotating magnetic field to the rotor 10. The rotor 10 accordingly rotates relative to the stator 20 about the axis of rotation P.

In the illustration of FIG. 1, at least a part of the stator 20 is covered with a stator mold 25. The stator mold 25 is made of resin and is in close contact with the stator 20. More specifically, for example, the stator mold 25 covers the stator 20 in a close contact manner at both sides of the stator 20 in the axial direction. As illustrated in FIG. 2, in the presence of air gaps between the individual portions of the winding 22 in the circumferential direction, the stator mold 25 may fill the air gaps. The stator mold 25 is integrally formed with, for example, the stator 20. The number of windings (the number of layers) of the winding 22 may be increased to reduce the air gaps between the individual portions of the winding 22. This improves a volume fraction (packing factor) indicating a ratio of the winding 22 to the air gaps between the teeth 211, thereby improving the efficiency of the electric motor 1.

The stator mold 25 can cover the stator 20 to protect the stator 20. In the illustration of FIG. 1, however, the surface of the stator 20 opposing the rotor 10 (the outer peripheral surfaces of the teeth 211) is not covered with the stator mold 25 and is exposed. This is for narrowing the air gap between the stator 20 and the rotor 10 to reduce magnetic resistance. As a result, the efficiency of the electric motor 1 can be improved. Although the stator mold 25 does not cover the inner peripheral surface of the back yoke 212 in the illustration of FIG. 1, the stator mold 25 may cover the inner peripheral surface. The inner peripheral surface of the back yoke 212 can therefore be protected as well.

In the illustration of FIG. 1, the inner peripheral surface of the back yoke 212 forms the hole 26. Although the hole 26 is open in, for example, its upper portion, it is closed by the stator mold 25 in, for example, its lower portion in the axial direction. In the illustration of FIG. 1, the shaft 30 passes through the hole 26 (back yoke 212) in the axial direction, and one end of the shaft 30 is buried into and fixed to the stator mold 25 on the bottom surface of the hole 26 (surface formed by the stator mold 25). Such burying and fixing are performed by, for example, integrally forming the shaft 30 and the stator mold 25.

As described above, the stator mold 25 fixes the stator 20 and the shaft 30 to each other, and thus, also functions as a coupling part for coupling the stator 20 and the shaft 30 to each other.

To the shaft 30 are mounted a plurality of bearings 41 and 42. The bearing 41 includes an inner ring 411, an outer ring 412, and a rolling element 413, each of which has conductivity. The inner ring 411 has a ring shape and, on its inner peripheral surface, is fixed to the shaft 30 while being in contact therewith. The outer ring 412 has a ring shape with a diameter larger than the diameter of the inner ring 411 and faces the inner ring 411 from its outer peripheral side. The rolling element 413 has, for example, a ball shape and rolls between the inner ring 411 and the outer ring 412 such that the outer ring 412 rotates relative to the inner ring 411. An insulating lubricating oil (not shown), or grease is applied between the inner ring 411 and the rolling element 413 and between the outer ring 412 and the rolling element 413 to reduce friction between the inner ring 411 and the rolling element 413 and between the outer ring 412 and the rolling element 413.

In the bearing 41 as described above, when the insulation by the lubricating oil is broken due to a potential difference generated between the inner ring 411 and the outer ring 412, a current flows between these rings. Consequently, galvanic corrosion can occur in the bearing 41.

The bearing 42 includes an inner ring 421, an outer ring 422, and a rolling element 423, each of which has conductivity. The bearing 42 has the same structure as the structure of the bearing 41, which will not be described repeatedly. Also in the bearing 42, when the insulation by the lubricating oil is broken due to a potential difference between the inner ring 421 and the outer ring 422, a current flows between these rings. Consequently, galvanic corrosion can occur in the bearing 42. The present embodiment is aimed at reducing such galvanic corrosion.

The bearings 41 and 42 are fixed to the shaft 30, with the inner rings 411 and 421 fitted with the shaft 30. The bearings 41 and 42 are mounted to the shaft 30 with an interval between these bearings in the axial direction.

The bearing housing 50 is a conductive member and is made of, for example, metal (such as aluminum). The bearing housing 50 has a tubular shape surrounding the shaft 30 with an air gap therebetween and contacts the outer rings 412 and 422 of the bearings 41 and 42. Consequently, the outer rings 412 and 422 are electrically connected to each other via the bearing housing 50. The bearing housing 50 faces the shaft 30 with an air gap therebetween, at least between the bearings 41 and 42.

In the illustration of FIG. 1, the bearing 41 is arranged above the stator 20 in the axial direction, and the bearing 42 is located inside the hole 26. In other words, the bearing 42 is located at a position at which the bearing 42 opposes the stator 20 in the radial direction. The bearing housing 50 contacts both the bearings 41 and 42, and accordingly, extends from the inside of the hole 26 upwardly beyond the stator 20.

In the illustration of FIG. 1, the bearing housing 50 extends so as to expand toward its outer periphery in the area above the stator 20. In the illustration of FIG. 1, thus, description can also be given that the bearing housing 50 includes a tubular member 51, which contacts the bearings 41 and 42, and a flange portion 52, which expands from the upper portion of the tubular member 51 toward the outer periphery thereof.

The coupling part 12 is fixed to the bearing housing 50 and the rotor 10 to couple the bearing housing 50 and the rotor 10 to each other. The coupling part 12 includes, for example, an inner tubular portion 123, an upper surface portion 121, and an outer tubular portion 122. The inner tubular portion 123 has a tubular shape and is fixed to the bearing housing 50 at the outer peripheral end of the flange portion 52. The upper surface portion 121 extends from the upper end portion on the outer peripheral side of the inner tubular portion 123 toward the outer periphery of the coupling part 12. The upper surface portion 121 has, for example, a plate ring shape. The outer tubular portion 122 has a tubular shape projecting downwardly in the axial direction from the outer peripheral edge of the upper surface portion 121. The outer tubular portion 122 is fixed to the rotor 10 (magnetic pole member 11).

The coupling part 12 is made of, for example, resin and is formed integrally with, for example, the bearing housing 50 and the rotor 10.

In the structure described above, the rotor 10 rotates together with the bearing housing 50 and the coupling part 12 relative to the shaft 30.

In the illustration of FIG. 1, between the bearing 42 and the stator mold 25 is provided a preload spring 35. The preload spring 35 is a spring formed of an elastic body extending helically, through which the shaft 30 passes. The preload spring 35 biases the bearing 42 and the stator mold 25 in such a direction that the bearing 42 and the stator mold 25 move away from each other.

A load (for example, fan) driven by the electric motor 1 is mounted to, for example, the bearing housing 50 or the coupling part 12. The load is provided to the upper portion of the electric motor 1 in the axial direction.

The electric motor 1 is fixed to a product mounting plate 60 opposite the load. The product mounting plate 60 has conductivity and is made of, for example, metal. The product mounting plate 60 has a plate shape and extends while intersecting the axis of rotation P. The product mounting plate 60 faces the electric motor 1 in the axial direction and is approximately orthogonal to, for example, the axis of rotation P. The product mounting plate 60 is electrically grounded.

In the illustration of FIG. 1, the stator mold 25 extends beyond the rotor 10 toward the outer periphery in the area lower than the rotor 10 in the axial direction, and has a through-hole 29, which is formed in the outer peripheral portion thereof. The through-hole 29 axially passes through this portion. The electric motor 1 is mounted to the product mounting plate 60 through the through-hole 29 with, for example, bolts.

Although an air gap is present between the product mounting plate 60 and the electric motor 1 in the illustration of FIG. 1, for example, the stator mold 25 and the product mounting plate 60 may be in close contact with each other. Also in this case, the product mounting plate 60 faces the conductive members of the electric motor 1 (such as the shaft 30, the bearings 41 and 42, and the stator core 21) with an interval therebetween, and is insulated from these conductive members.

The electric motor 1 is driven by application of an AC voltage to the winding 22. The AC voltage is produced by, for example, a voltage-source inverter. The voltage-source inverter adjusts the pulse width of an output voltage to produce an AC voltage in a pseudo manner, thus causing fluctuations in common mode voltage. The common mode voltage is applied between the inner ring 411 and the outer ring 412 of the bearing 41 via stray capacitances produced in the components of the electric motor 1. When the voltage applied to the bearing 41 exceeds a breakdown voltage of the lubricating oil, a current flows to cause galvanic corrosion in the bearing 41. The same applies to the bearing 42.

Figure 3:
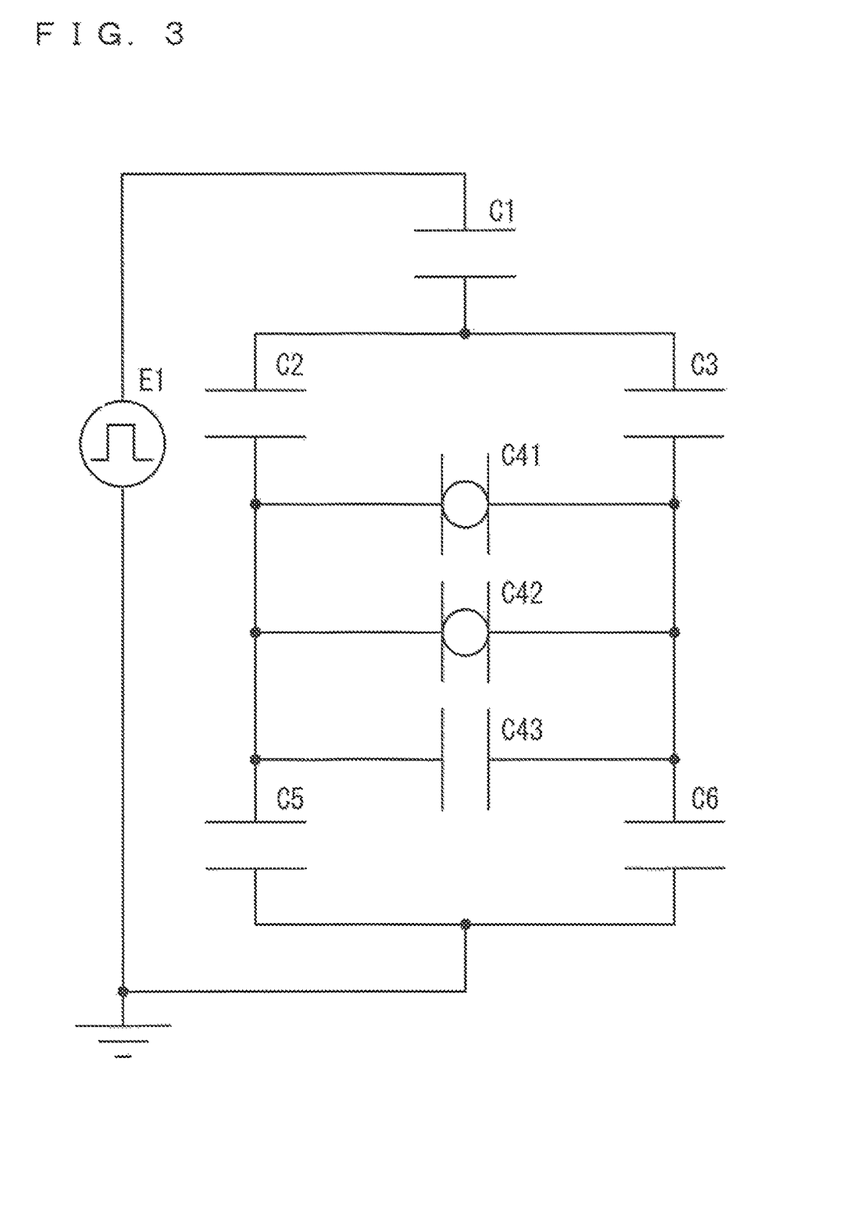
FIG. 3 is a diagram showing an example of an equivalent circuit.

FIG. 3 illustrates an equivalent circuit of the electric motor 1. In FIG. 3, fluctuations in common mode voltage are indicated by a pulse signal source E1. Also with reference to FIG. 1, in the electric motor 1, between the winding 22 and the stator core 21 is present a stray capacitance C1, between the stator core 21 and the shaft 30 is present a stray capacitance C2, and between the stator core 21 and the bearing housing 50 is present a stray capacitance C3. Between the shaft 30 and the bearing housing 50 are present stray capacitances C41 and C42 (FIG. 3) of the bearings 41 and 42 and a stray capacitance C43. The stray capacitance C43 is formed by portions of the shaft 30 and the bearing housing 50 different from the portions thereof that contact the bearings 41 and 42. Between the shaft 30 and the product mounting plate 60 is present a stray capacitance C5, and between the bearing housing 50 and the product mounting plate 60 is present a stray capacitance C6.

In the equivalent circuit of FIG. 3, the stray capacitances C2 and C5 are connected in series with each other between the stray capacitance C1 and the ground (potential of the product mounting plate 60), and the stray capacitances C3 and C6 are connected in series with each other between the stray capacitance C1 and the ground. The stray capacitances C41, C42, and C43 are connected in parallel with each other. One end of each of these stray capacitances is connected to a connection point between the stray capacitances C2 and C5, and the other end is connected to a connection point between the stray capacitances C3 and C6. The stray capacitance C1 is connected in series with a set of the stray capacitances C2, C3, C41 to C43, C5, and C6.

The pulse signal source E1 is provided between the ground and an end of the stray capacitance C1 opposite the stray capacitances C2 and C3. That is to say, the pulse signal source E1 is connected in parallel with the set of the stray capacitances C1 to C3, C41 to C43, C5, and C6.

In such an equivalent circuit, voltages to be applied to the bearings 41 and 42 can be reduced more as a combined stray capacitance of the stray capacitances C41 to C43 is larger, thus preventing or reducing galvanic corrosion in the bearings 41 and 42.

The bearing housing 50 that electrically connects the bearings 41 and 42 with each other faces the shaft 30 over its entire periphery around the axis of rotation P. The shaft 30 and the bearing housing 50 thus have large opposing areas.

According to Japanese Patent Application Laid-Open No. 2013-66253, a rod-shaped conduction pin for electrically connecting conductive brackets that are fixed to bearings opposes a rod-shaped shaft, resulting in extremely small opposing areas thereof. According to Japanese Patent Application Laid-Open No. 2013-66253, thus, a stray capacitance between the rod-shaped conduction pin and the rod-shaped shaft, which corresponds to the stray capacitance C43, is small.

According to the electric motor 1, the bearing housing 50 faces the shaft 30 over its entire periphery, resulting in a much greater stray capacitance (combined stray capacitance) between the shaft 30 and the bearing housing 50 than the stray capacitance of Japanese Patent Application Laid-Open No. 2013-66253. Consequently, galvanic corrosion caused in the bearings 41 and 42 can be prevented or reduced more than in the case of Japanese Patent Application Laid-Open No. 2013-66253.

As illustrated in FIG. 1, the rotor 10 and the stator 20 are provided so as not to be located between the bearing housing 50 and the shaft 30. Compared with the structure in which the rotor 10 and the stator 20 are provided between the bearing housing 50 and the shaft 30, the bearing housing 50 can face the shaft 30 at a short distance. The electric motor 1 can thus increase the stray capacitance C43 more than in the above-mentioned structure. Consequently, galvanic corrosion can be prevented or reduced.

As is understood from the description above, the stray capacitance C43 can be increased to prevent or reduce galvanic corrosion. Thus, it suffices that the electric motor 1 includes the bearing housing 50, the bearings 41 and 42, and the shaft 30 described above. From this point of view, the electric motor 1 is not limited to an outer-rotor motor and may be an inner-rotor motor, or is not limited to a radial gap motor and may be an axial gap motor. Although the stator 20 is fixed to the shaft 30 and the rotor 10 is fixed to the bearing housing 50 in the illustration of FIG. 1, the rotor 10 may be fixed to the shaft 30 and the stator 20 may be fixed to the bearing housing 50.

Although two bearings 41 and 42 are provided in the example described above, three or more bearings may be provided.

In the illustration of FIG. 1, the bearing housing 50 has a part located at the side adjacent to the inner periphery (at the side adjacent to shaft 30) with respect to the outer periphery surface of the outer rings 412 and 422, for example, between the bearings 41 and 42. In other words, the inner peripheral surface 53 of the bearing housing 50 is located at the side adjacent to the inner peripheries of the outer rings 412 and 422 with respect to the outer peripheries thereof. This reduces a distance between the bearing housing 50 and the shaft 30, thus increasing the stray capacitance C43. Consequently, galvanic corrosion in the bearings 41 and 42 can be prevented or reduced further.

If the outer rings 412 and 422 have different outside diameters, it suffices that the inner peripheral surface 53 of the bearing housing 50 is located at the side adjacent to the inner periphery with respect to the outer periphery surface of one of the outer rings 412 and 422 that is farther from the shaft 30. It is noted that if the inner peripheral surface 53 is located at the side adjacent to the periphery with respect to the outer periphery surface of one of the outer rings 412 and 422 that is closer to the shaft 30, the stray capacitance C43 can be increased further.

The inner peripheral surface 53 of the bearing housing 50 may be located inside the outer peripheral surfaces of the inner rings 411 and 421 of the bearings 41 and 42, because the stray capacitance C43 can be increased further. It is noted that the bearing housing 50 is not in contact with but is apart from the inner rings 411 and 421. This is because while the bearing housing 50 rotates together with the outer rings 412 and 422 relative to the shaft 30, the inner rings 411 and 421 are fixed to the shaft 30.

To increase the stray capacitance C43, the opposing areas of the bearing housing 50 and the shaft 30 may be increased. From this point of view, the lengths of the opposing portions of the shaft 30 and the bearing housing 50 in the axial direction are desirably increased. Merely increasing the shaft 30 and the bearing housing 50 in the axial direction, however, results in an increased dimension of the electric motor 1 in the axial direction.

In the illustration of FIG. 1, the bearing 42 is located inside the hole 26 of the stator 20, and the bearing 41 is located above the stator 20. Therefore, one part of the bearing housing 50 that contacts the bearings 41 and 42 is inserted into the hole 26 of the stator 20, and the other part extends from the hole 26 toward the outside thereof along the axial direction.

As a result, the length of the bearing housing 50 in the axial direction can be increased more than in the case where the bearing 42 and the bearing housing 50 are located only in the area above the stator 20 in the axial direction. Moreover, the dimension of the electric motor 1 in the axial direction does not need to be increased, because the length of the bearing housing 50 is increased inside the hole 26. Accordingly, the length of the bearing housing 50 in the axial direction can be increased without increasing the dimension of the electric motor 1 in the axial direction, thus preventing or reducing the occurrence of galvanic corrosion.

Even when the bearing 42 is disposed in the area above the stator 20, it suffices that a part of the bearing housing 50 is inserted into the hole 26. This is because the stray capacitance C43 can be increased without increasing the dimension of the electric motor 1 in the axial direction.

In the illustration of FIG. 1, the bearing housing 50 that is a member electrically connecting the bearings 41 and 42 is a one-piece member. The one-piece member herein refers to the bearing housing 50 that is formed through the continuity of the same material. According to Japanese Patent Application Laid-Open No. 2013-66253, the connecting member electrically connecting the bearings is formed of the brackets, which contact the respective bearings, and the conduction pin, which connects the brackets. Therefore, the electric motor 1 can need a lower part count than in the case of the connection member of Japanese Patent Application Laid-Open No. 2013-66253, thus reducing manufacturing cost.

In the illustration of FIG. 1, the bearing housing 50 electrically connecting the bearings 41 and 42 is provided so as not to be located in an area below a lower end (at the side adjacent to the product mounting plate 60) of the stator 20 (more specifically, the stator core 21) and to be located in an area above the lower end. This is desirable in view of, for example, improved balance between the stray capacitances C5 and C6, which will be described below. The improved balance herein refers to a reduced difference between stray capacitances.

The product mounting plate 60 faces the electric motor 1 in the axial direction. More specifically, the product mounting plate 60 faces the stator 20 with an interval therebetween. The stray capacitance C5 is thus formed mainly by the product mounting plate 60 and an end surface 31 of the shaft 30 at the side adjacent to the product mounting plate 60. The end surface 31 has a small area, and thus, the stray capacitance C5 is small.

Contrastingly, the stray capacitance C6 is formed by the product mounting plate 60 and the end surface of the bearing housing 50 at the side adjacent to the product mounting plate 60. In the illustration of FIG. 1, the area of the end surface of the bearing housing 50 is also small, and thus, the stray capacitance C6 is small.

The bracket (the member electrically connected to the bearing) of Japanese Patent Application Laid-Open No 2013-66253 is provided in an area below the stator (opposite the load) and also expands in the radial direction, unlike the bearing housing 50 of FIG. 1. Thus, in the case where a product mounting plate is provided to the armature of Japanese Patent Application Laid-Open No. 2013-66253 from the side opposite the load, the bracket and the product mounting plate face each other at a relatively short distance and with large opposing areas. The stray capacitance (corresponding to the stray capacitance C6) between the bracket and the product mounting plate is therefore large.

It is noted that also according to Japanese Patent Application Laid-Open No. 2013-66253, the stray capacitance (corresponding to the stray capacitance C5) between the shaft and the product mounting plate is small. This is because the area of the end surface of the shaft is small. Consequently, the balance between these stray capacitances is lost, resulting in an increased difference between the potential of the bracket (potential of the outer ring of the bearing) and the potential of the shaft (potential of the inner ring of the bearing).

Contrastingly, in the illustration of FIG. 1, the bearing housing 50 is located above the lower end of the stator 20 (more specifically, the stator core 21). For example, in the case where the lower end surface of the bearing housing 50 is located inside the hole 26 as illustrated in FIG. 1, the end surface of the bearing housing 50 cannot expand toward its outer periphery beyond the hole 26, and faces the product mounting plate 60 with a small opposing area compared with that of Japanese Patent Application Laid-Open No. 2013-66253. The stray capacitance C6 is therefore small compared with Japanese Patent Application Laid-Open No. 2013-66253.

In the case where the lower end surface of the bearing housing 50 is located in the area above the stator 20, the distance with the product mounting plate 60 is increased though the end surface of the bearing housing 50 can expand toward its outer periphery, whereby the stray capacitance C6 is small.

The stray capacitance C6 can be reduced as described above, thus reducing a difference between the stray capacitance C5 and the stray capacitance C6. This reduces voltages to be applied to the bearings 41 and 42, thereby preventing or reducing galvanic corrosion in the bearings 41 and 42.

Figure 4:
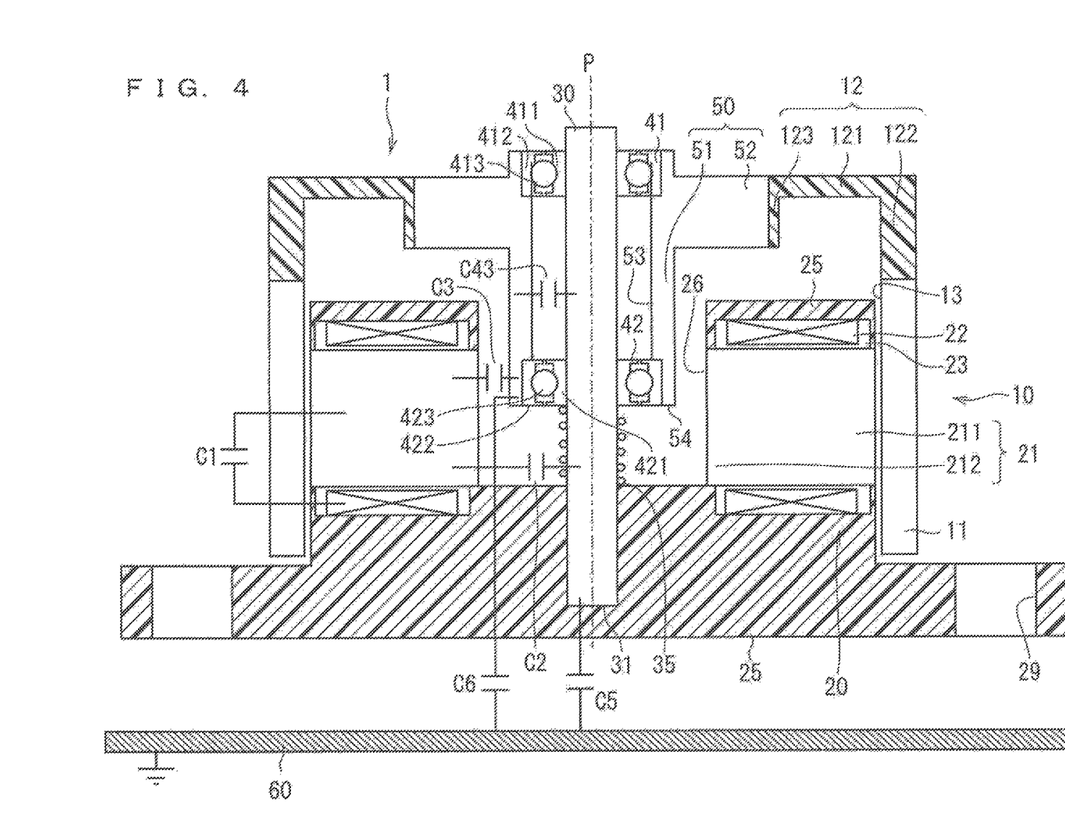
FIG. 4 is a sectional view of an example of a schematic configuration of an electric motor.

FIG. 4 illustrates an example of a schematic configuration of the electric motor 1. The electric motor 1 of FIG. 4 has a configuration similar to that of FIG. 3. With reference to FIG. 4, however, an end surface 54 at the lower side (at the side adjacent to the product mounting plate 60) of the bearing housing 50 in the axial direction is located above the center of the stator core 21 in the axial direction (opposite the product mounting plate 60). More specifically, the end surface 54 is located between the center of the stator core 21 in the axial direction and the upper end surface of the stator core 21. This contributes to an improvement in the balance between the stray capacitances C2 and C3.

The stray capacitance is proportional to the inverse of the distance between target components and opposing areas thereof. The stray capacitance C2 between the stator 20 (more specifically, the stator core 21) and the shaft 30 and the stray capacitance C3 between the stator core 21 and the bearing housing 50 are considered here in view of opposing areas. The shaft 30 is shielded by the bearing housing 50, and accordingly, the opposing areas of the stator core 21 affect the stray capacitance C2 and the portion of the shaft 30 exposed from the bearing housing 50. That is to say, the stray capacitance C2 depends on the position of the end surface 54 of the bearing housing 50. This reveals that controlling the position of the end surface 54 of the bearing housing 50 controls the opposing areas of the stator core 21 and the shaft 30 and the opposing areas of the stator core 21 and the bearing housing 50.

In view of distance, the shaft 30 is farther from the stator core 21 than the bearing housing is from the stator core 21, so that the stray capacitance C2 tends to be smaller than the stray capacitance C3.

In order to prevent or reduce galvanic corrosion, a difference between these two stray capacitances C2 and C3 is desirably made as small as possible. Since the stray capacitance C2 is smaller than the stray capacitance C3 in view of distance as described above, in view of opposing area, the stray capacitance C2 is desirably made larger than the stray capacitance C3.

In the illustration of FIG. 4, the end surface 54 is thus located between the center of the stator core 21 in the axial direction and the upper end surface of the stator core 21. As a result, the opposing area in the stray capacitance C2 can be made larger than the opposing area in the stray capacitance C3. The balance between the stray capacitances C2 and C3 can therefore be improved more than in the case where the end surface 54 is provided below the center of the stator core 21.

More preferably, the ratio of the distance between the stator 20 and the bearing housing 50 to the distance between the stator 20 and the shaft 30 is matched with the ratio of the opposing areas of the stator core 21 and the bearing housing 50 to the opposing areas of the stator core 21 and the shaft 30. Theoretically, the stray capacitances C2 and C3 can therefore be matched.

In the illustration of FIG. 1, the shaft 30 is fixed to the stator core 21, and the bearing housing 50 is fixed to the rotor 10. Considered here is the case where the shaft 30 is fixed to the rotor 10 and the stator core 21 is fixed to the bearing housing 50, unlike the illustration of FIG. 1. In this case, the stator core 21 is apart from the shaft 30, and thus, is insulated from the shaft 30. The stator core 21 is fixed to the bearing housing 50. Such fixing is conceivably achieved by the structure in which the stator core 21 is fixed to the bearing housing 50 while being in contact therewith, and the structure in which the stator core 21 is fixed to the bearing housing 50 with an insulating member therebetween. In the former structure, however, the stray capacitance C3 is infinite. Therefore, the latter structure is desirable, that is, the stator core 21 is desirably fixed to the bearing housing 50 with an insulating member (for example, resin) therebetween.

The above embodiments of the present invention can be appropriately modified or omitted as long as they are consistent with each other.

While the electric motor has been shown and described in detail, the foregoing description is in all aspects illustrative and not restrictive. It is therefore understood that numerous modifications and variations can be devised without departing from the scope of the invention.

What is claimed is:

1. An electric motor configured to be oppositely spaced from a plate electrically grounded in an axial direction extending along an axis of rotation, said electric motor comprising:
    a rotor arranged to rotate around said axis of rotation;
    a stator located at a side adjacent to said axis of rotation with respect to said rotor, said stator including
        teeth facing said rotor with an air gap formed therebetween and having conductivity,
        a back yoke coupling ends of said teeth at the side adjacent to said axis of rotation to each other, said back yoke having a tubular shape and having conductivity, and
        windings wound around said teeth;
    a shaft extending along said axis of rotation and passing through said back yoke to be fixed to one of said stator and said rotor;
    at least one bearing including
        an inner ring fixed to said shaft and having conductivity, and
        an outer ring coupled to said inner ring so as to rotate relative thereto and having conductivity; and
    a bearing housing extending in said axial direction
        so as not to be located in a first area at a side adjacent to said plate with respect to an end of said stator, and
        so as to be located in a second area opposite said plate with respect to said end along said axial direction, said end being at said side,
        said bearing housing being fixed to said outer ring of said bearing and to an other of said stator and said rotor.

2. The electric motor according to claim 1, wherein
said stator includes a stator core having a hole into which said shaft and said bearing housing are inserted, and
an end surface of said bearing housing at the side adjacent to said plate is located between an end surface of said stator core opposite said plate and a center of said stator core along said axial direction.

3. The electric motor according to claim 1, wherein
said at least one bearing includes a plurality of bearings, and
said bearing housing has a tubular shape surrounding said shaft with an air gap formed therebetween, and said bearing housing contacts at least two of said outer rings of said plurality of bearings.

4. The electric motor according to claim 3, wherein
said bearing housing includes a part located at a side adjacent to said shaft with respect to outer surfaces of said outer rings of said plurality of bearings.

5. The electric motor according to claim 3, wherein
one part of said bearing housing is inserted into a hole formed by an inner peripheral surface of said back yoke, and an other part of said bearing housing extends along said axial direction outside said hole.

6. The electric motor according to claim 1, wherein
said bearing housing is a one-piece member.

7. The electric motor according to claim 1, wherein
said stator is insulated from both said housing and said shaft.

8. The electric motor according to claim 2, wherein
said at least one bearing includes a plurality of bearings, and
said bearing housing has a tubular shape surrounding said shaft with an air gap formed therebetween, and said bearing housing contacts at least two of said outer rings of said plurality of bearings.

9. The electric motor according to claim 8, wherein
said bearing housing includes a part located at a side adjacent to said shaft with respect to outer surfaces of said outer rings of said plurality of bearings.

10. The electric motor according to claim 8, wherein
one part of said bearing housing is inserted into a hole formed by an inner peripheral surface of said back yoke, and an other part of said bearing housing extends along said axial direction outside said hole.

11. The electric motor according to claim 2, wherein
said bearing housing is a one-piece member.

12. The electric motor according to claim 2, wherein
said stator is insulated from both said housing and said shaft.

* * * * *